United States Patent [19]

Fischer et al.

[11] Patent Number: 4,741,873
[45] Date of Patent: May 3, 1988

[54] METHOD FOR FORMING RIGID COMPOSITE PREFORMS

[75] Inventors: Mel J. Fischer; Hollis O. Davis, both of Alameda; Shih Huei Chen, San Leandro, all of Calif.

[73] Assignee: Kaiser Aerotech, a Division of Sowa & Sons, San Leandro, Calif.

[21] Appl. No.: 852,066

[22] Filed: Apr. 15, 1986

[51] Int. Cl.⁴ .................. B29B 11/16; B29C 53/58
[52] U.S. Cl. ........................... 264/25; 57/362; 87/6; 156/148; 264/29.5; 264/103; 264/136; 264/137; 264/258; 264/324
[58] Field of Search ...... 264/137, 136, 103, 29.1–29.7, 264/174, 25, 258, 324; 87/6; 156/148, 149; 57/362; 139/426 R; 19/149, 302, 303

[56] References Cited

U.S. PATENT DOCUMENTS

| | | | |
|---|---|---|---|
| 3,415,919 | 12/1968 | Kippan | 264/174 |
| 3,444,025 | 5/1969 | Hillas | 264/174 |
| 3,466,210 | 9/1969 | Wareham | 264/103 |
| 3,728,423 | 4/1973 | Shaffer | 264/29 |
| 3,779,851 | 12/1973 | Hertz | 156/309 |
| 3,914,395 | 10/1975 | Finelli et al. | 423/448 |
| 3,994,762 | 11/1976 | Wrzesien et al. | 156/148 |
| 4,140,832 | 2/1979 | Menegay | 428/288 |
| 4,152,381 | 5/1979 | Peterson | 264/29.5 |
| 4,320,079 | 3/1982 | Minnear et al. | 264/102 |
| 4,394,467 | 7/1983 | Edelman | 523/205 |
| 4,396,663 | 8/1983 | Mitchell et al. | 264/29.1 |
| 4,412,854 | 11/1983 | Layden | 264/125 |
| 4,519,290 | 5/1985 | Inman et al. | 87/7 |
| 4,568,581 | 2/1986 | Peoples, Jr. | 264/126 |
| 4,571,317 | 2/1986 | Layden, Jr. et al. | 264/29.4 |
| 4,613,473 | 9/1986 | Layden et al. | 264/103 |
| 4,622,192 | 11/1986 | Ma | 264/136 |

*Primary Examiner*—Jeffery Thurlow
*Attorney, Agent, or Firm*—Townsend & Townsend

[57] ABSTRACT

Rigidized composite preforms are fabricated by first serving individual reinforcement strands with a thread of a thermoplastic material. After shaping the reinforcement strands into a desired geometry, the shaped strands are heated to melt the thermoplastic threads. By then cooling the shaped reinforcement strands, the thermoplastic material solidifies and acts as an adhesive or glue in holding the preform together in a rigid fashion. Such rigid preforms are particularly suitable for handling, storage and transportation to other locations and media prior to densification. Densification may be performed by conventional techniques to produce the final composite article. Pyrolysis of the matrices and subsequent densification of the matrix may be accomplished.

40 Claims, 2 Drawing Sheets

FIG._1.

METHOD FOR FORMING RIGID COMPOSITE PREFORMS

BACKGROUND OF THE INVENTION

1. Field of the Invention

The present invention relates generally to methods for the fabrication of composite materials. More particularly, the present invention relates to a method for forming rigid composite preforms composed of reinforcement strands which have been served with a thermoplastic thread.

Composite materials are generally defined as a mixture or combination of two or more elements that differ in form and are essentially insoluble in one another. The present invention is concerned with strand-reinforced composites where a plurality of elongate reinforcement strands are embedded in a bulk matrix. Typically, the reinforcement strands are prepared from fibers or filaments having a high tensile strength, while the bulk matrix is an organic resin. The resulting composite materials thus possess the high strength of the reinforcement strands and are amenable to shaping by properly forming the matrix while in the softened, low viscosity condition. A wide variety of reinforcement materials have been used, typified by glass fibers, carbon and graphite fibers, silicon carbide fibers, metal fibers, aluminum oxide fibers, and the like. The matrix may be organic or inorganic, including organic resins, such plastic resins, epoxy resins, and inorganic materials, such as silicon carbide glass or metal mixtures.

Articles may be formed from composite materials by a number of techniques. Two dimensional sheets may be formed by first weaving the reinforcement strands into a flat sheet, followed by impregnation of the sheet with the desired matrix. The sheets may also be stacked as a prepreg to a desired thickness. They may also be stacked prior to impregnation by a technique referred to as hand lay-up, and subsequently impregnated. Three-dimensional articles may be formed by filament winding, where the elongate reinforcement strands are placed around a mandril having the desired shape with other yarns placed in the axial and radial directions. More complex multiple-dimensional shapes may also be formed on commercially available weaving machines.

The shaped fabric prior to impregnation with the organic matrix is usually referred to as the preform or prepreg. In some cases, the individual reinforcement strands will have been at least partially impregnated with a desired organic resin prior to the shaping operation, but the resulting article will still be referred to as a preform or prepreg since final impregnation and curing are required before the composite article is completed.

In order to obtain precisely sized and shaped composite articles from two-dimensional, three-dimensional, and multiple-dimensional weaves, it is necessary that the preforms be held in shape during the weaving and subsequent impregnation process. In some cases, this is achieved by leaving the preform on the shaping mandril during the impregnation step. In many cases, however, it is desired to remove the preform from the mandril prior to impregnation. Often, for example, the preform may be stored and transported from one location to another prior to the impregnation step. In these cases, it is necessary that the preform be sufficiently rigid to maintain its shape and preform yarn configuration. Moreover, handling flow of liquid during impregnation, curing shrinkage and expansion, and pyrolysis shrinkage, can also cause yarn and layer separation and deformation.

For the above reasons, it is desirable to provide methods for forming rigid preforms for use in fabricating composite articles. In particular, it is desirable that the preforms be made rigid without substantially affecting the yarn fiber volume or other properties of the resulting composite and that such rigidization be accomplished in an economical and efficient manner.

2. Description of the Relevant Art

U.S. Pat. No. 3,994,762 to Wrzesien et al. discloses the preparation of three-dimensional preforms using a needle punching technique. The preforms are pre-sized by impregnation with a thermosetting or thermoplastic material. U.S. Pat. No. 4,394,467 to Edelman discloses the coating of carbon fibers with a polyamic acid oligomer to facilitate holding the resulting preform together during a subsequent matrix impregnation step. U.S. Pat. No. 4,519,290 to Inman et al. discloses a machine for braiding reinforcement fibers in a composite material product. U.S. Pat. No. 3,779,851 relates to introduction of thermosetting plastics and/or thermoplastics to form prepreg plates which are later bonded together and cured. U.S. Pat. No. 3,728,423 relates to introduction of a thermosetting plastic to a fabric precursor which is subsequently molded at low temperature. The thermosetting plastic is not set, however, until the structure is carbonized and graphitized. U.S. Pat. No. 4,140,832 relates to prerigidization by employing particular carbon fibers having from 40 to 90% by weight mesophase by heating in an oxidizing environment. Finally, U.S. Pat. No. 3,914,395 discloses a multiple graphitization process where the matrix binder is initially converted to a continuous amorphous carbon matrix which holds the fibers in place. U.S. Pat. Nos. 4,152,381 and 4,320,079 are also of interest.

SUMMARY OF THE INVENTION

According to the present invention, preforms for composite articles are fabricated from reinforcement strands which have been served with at least one thermoplastic thread. After serving, such reinforcement strands are shaped into a desired geometry by conventional techniques, and the shaped strands heated to a temperature sufficient to melt the thermoplastic. By then cooling the shaped strands, the thermoplastic material solidifies to produce interyarn and interply bonding, forming a rigid structure which will retain the desired geometry during subsequent processing operations, including matrix impregnation and/or pyrolysis to form the composite article. Such rigidized preforms are also suitable for storage and transportation to other locations for the final processing operations.

In the preferred embodiment, the reinforcement strands will be non-impregnated prior to the matrix impregnation operation. Thus, the only resin material present in the shaped strands will be derived from the thermoplastic thread. It has been found that very small amounts of the thermoplastic material are required to rigidize the preform, being as low as about 0.01% based on the weight of the reinforcement strands, usually being in the range from about 0.1 to 10% by weight. Such low amounts of thermoplastic material will usually not affect the critical properties of the final composite article, such as fiber volume, tensile and flexural strength, and the like. Indeed, by enhancing the compaction of the reinforcement strands prior to impregnation and/or pyrolysis, the fiber volume and strength of the resulting composite are usually increased.

DESCRIPTION OF THE PREFERRED EMBODIMENTS

Figure 1:
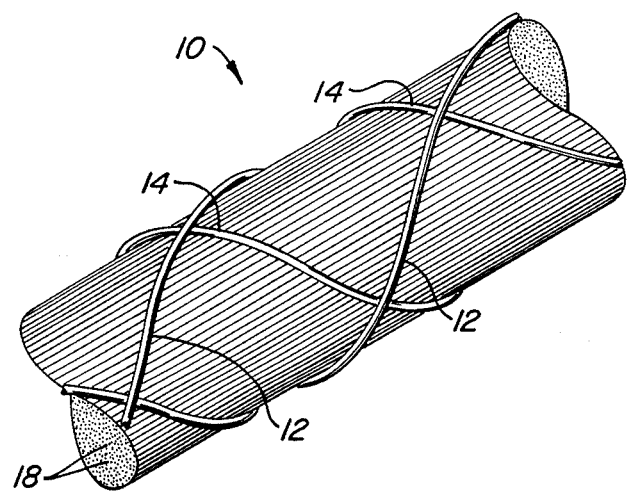
FIG. 1 is a perspective view illustrating a single reinforcement strand which has been served by two separate thermoplastic threads.

The present invention is concerned with the fabrication of what are generally referred to as fiber reinforced composite articles. Such articles comprise reinforcement strands, usually inorganic filaments or yarns, which are embedded in an organic matrix, typically a phenolic or epoxy resin, or a carbonaceous or ceramic matrix. In conventional fabrication techniques, the reinforcement strands are first shaped into a desired two-dimensional, three-dimensional, or multiple-dimensional geometry, followed by introduction and curing of the resin or matrix. The present invention provides a method for rigidizing the preform prior to resin or matrix introduction. The method will find use with fabrication of virtually all types of fiber reinforced composites, including glass-fiber reinforced materials, graphite fiber-reinforced materials, and the like.

The reinforcement strands will be continuous filaments or multifilament bundles (yarns). The dimensions and tensile strength of the reinforcement strands will vary depending on the material employed, the ultimate use of the composite article, and the like. Typically, monofilaments will have a diameter in the range from about 1 to 150 $\mu$m, usually in the range from about 5 to 10 $\mu$m. Yarns will be comprised of a plurality of individual monofilaments, typically from about 100 to 20,000 filaments, usually from about 3000 to 6000 filaments, with each filament having a diameter in the range from about 1 to 20 $\mu$m. The denier of both the monofilaments and the yarns used as reinforcement strands will typically be in the range from about 500 to 5000 mg/m, usually in the range from about 1000 to 2000 mg/m. Denier is equal to the number of grams which yields 9000 meters of the yarn or filament.

Suitable reinforcement strands may be composed of a wide variety of materials, usually although not necessarily being inorganic filaments. Suitable materials include glass filaments and yarns, such as fused silica, "C" glass, "D" glass, "E" glass, "M" glass, "S" glass, X2285, 2124, VARL 344, VARL 417, and PRD-49, available from a wide variety of commercial suppliers, including Owens-Corning Fiberglass Corp., Toledo, Ohio, and PPG Industries, Pittsburg, Pa. Suitable ceramic fibers include silicon carbide, alumina, boron/tungsten, boron carbide, boron nitride, and zirconia filaments and yarns available from commercial suppliers such as Dow-Corning, Midland, Mich.; AVCO, Specialty Materials Division, Lowell, Mass.; and the 3 M Company, Minneapolis, Minn.; and carbon or graphite filaments and yarns available from Hercules, Inc., Wilmington, Del., Celanese Engineering, Chatham, N.J., Union Carbide Corporation, Specialty Polymers and Composites Division, Danbury, Conn., and Hitco, Gardena, Calif. Aramid filaments and yarns, available commercially from suppliers such as DuPont de Nemours, Wilmington, Del., under the trade name Kevlar are also suitable.

The preforms will usually be composed of a single type of reinforcement strands, although in some cases it may be desirable to employ two or more different reinforcement materials. Similarly, reinforcement yarns may be composed of two or more filament materials when it is desired to combine the characteristics of the various materials.

The reinforcement strands are served with a thermoplastic thread, which itself may be a monofilament or multifilament bundle (yarn). One or more threads are wound helically around the reinforcement strand, usually at a pitch of at least two turns per centimeter, more usually at a pitch of at least ten turns per centimeter, often at a pitch of 25 turns per centimeter or more.

Monofilaments utilized for serving will typically have a diameter in the range from about 1 to 50 $\mu$m, more typically in the range from about 5 to 10 $\mu$m. Multifilament serving yarns may include from about 25 to 150 individual filaments, usually including from about 50 to 100 individual filaments. The denier of the thermoplastic filament or yarn used for serving will typically be much less than that of the reinforcement strand. The denier will usually be in the range from about 0.5 to 500 mg/m, more usually in the range from about 50 to 200 mg/m. The weight percentage of the thermoplastic thread may thus be as low as 0.01%, usually being in the range from about 0.1% to 10%.

Suitable thermoplastic materials for the serving threads include polyamides, such as nylons; polyesters, such as dacron; acrylonitriles, such as orlon; polycarbonates; polysulfones; and the like. Thermoplastic yarns may be made from two or more different materials, although usually they will comprise a single material. Also, when more than one thread is utilized, the individual threads may be composed of differing materials, although this will usually not be the case.

Commercial serving equipment is available for performing the desired serving operation. Such equipment is available from suppliers such as New England Butt, Providence, R.I. To utilize such equipment, continuous lengths of both the reinforcement strand and the thermoplastic thread are fed to the machine, which wraps the thread around the reinforcement strand at a desired pitch and in a desired pattern.

Referring now to FIG. 1, in the preferred embodiment, a served reinforcement strand 10 is formed by winding at least two thermoplastic threads 12 and 14 around a reinforcement strand 18. Usually, the threads will be wrapped in opposite directions, with thread 12 being wound helically in one direction and thread 14 being wound helically in the opposite direction. The present invention may employ as many as 10 or more separate thermoplastic threads as serving.

Once the served reinforcement strands are prepared, conventional techniques will be utilized for shaping the threads into a desired two-dimensional or three-dimensional geometry. Such techniques include weaving, filament winding, tape wrapping, and three-dimensional/multiple-dimensional weaving. The method of the present invention is of particular interest when utilized with three-dimensional and multiple-dimensional weaving techniques. A number of proprietary three-dimensional weaving systems are available, such as the Ultraweave system, available from FMI, the Avco/Brochere system, available from Avco/Brochere, Lowell, Mass., the Aerospatiala, available from Hercules, Inc. The method is also suitable with various pultrusion processes, where linear elements are formed.

After or during the shaping operation, the preforms are heated to a temperature sufficient to melt the thermoplastic thread. The melted thermoplastic material then acts as an adhesive or glue which secures the individual reinforcement strands relative to each other. After heating, the shaped reinforcement strands are cooled so that the thermoplastic material solidifies, creating a rigidized preform.

Heating of the preform may be accomplished by convection, conduction, or radiative heat transfer. Convection is usually achieved by placement in a suitable oven or directing a heated airstream at the preform. Conduction may be achieved by heating the mandril on which the preform is woven, or placement of two-dimensional preforms on heated plates. Radiation may be accomplished by placing the preforms under heat lamps or other heated elements.

After the preforms have been rigidized, they are ready for introduction of the organic or organo-metallic matrix, usually referred to as impregnation or densification. A variety of organic resins are available for impregnation, including epoxys, polyesters, polyamides, polyimides, silicones, phenolic resins, furfuraldehydes, liquid pitch, and the like. The resin materials may be used singly or may be combined to achieve desired characteristics.

Impregnation of the organic matrix occurs by conventional techniques, such as molding, spraying, dipping and evacuated/pressure liquid transfer. Such methods are well known in the art and need not be further described herein. Alternatively, the preforms may be densified with an organo-metallic matrix by chemical vapor deposit. Suitable organo-metallics include SiC and HPC.

The following examples are offered by way of illustration and not by way of limitation.

EXPERIMENTAL

The following examples employed a served carbon filament yarn, prepared as follows. T-3000 carbon filament yarn (Union Carbide, 3000 filaments per bundle) was served with two nylon yarns (50 denier) wrapped in opposite directions at five turns per inch. Serving was performed by Prodesco, Perkasie, Pa.

A two-dimensional fabric (24×24 count) was woven from the served yarn in an eight harness satin weave. The fabric was cut into 2"×4" sections and seven layers (plies) were stacked and compacted. The compacted preform was heated to 600°-650° F. for about 10 minutes and then cooled to room temperature. The resulting preform was rigid and was able to maintain the compaction.

Figure 2:
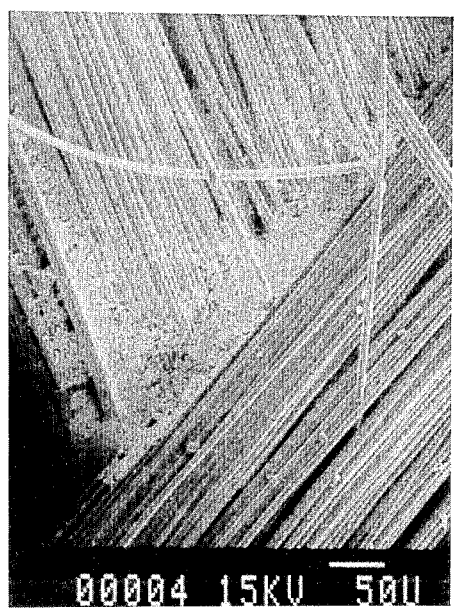
FIG. 2 is a photomicrograph of a preform rigidized in accordance with the principles of the present invention taken at a magnification of 500x.
Figure 3:
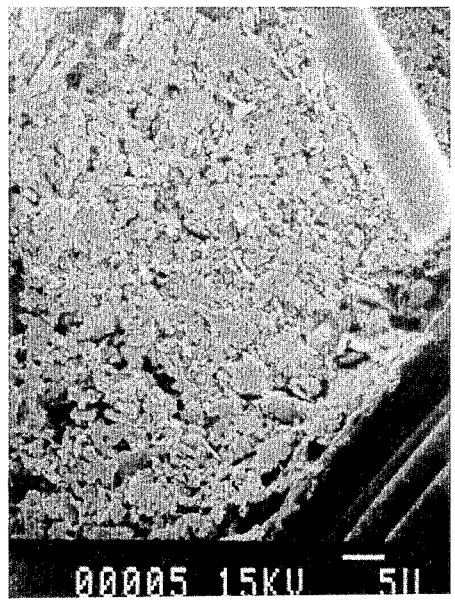
FIG. 3 is a photomicrograph of the same rigidized preform as in FIG. 2, where the magnification is at 5000x.

Photomicrographs of the rigidized preforms were taken with a scanning electron microscope and are presented in FIG. 2 (500x magnification). The photomicrographs clearly illustrate the interyarn bonding afforded by the thermoplastic. In particular, it should be noted that the thermoplastic bonding material migrates and collects at the cross-over points where the yarn strands contact each other. Such collection at these points is advantageous since it is at the cross-over points where the bonding must take place. Moreover, since the thermoplastic migrates to the precise location where bonding is required, less thermoplastic is needed which ultimately allows for an increased fiber volume.

A three-dimensional preform was fabricated as follows. The nylon served carbon yarn was woven into a 2"×2"×6" block. The fiber volume was approximately 40% with one-third of the volume in each of the three dimensions. The preform block was rigidized by heating to 600°-650° F. for approximately 10 minutes, followed by cooling to room temperature. The resulting preform was rigid with no appreciable loss of fiber volume or damage to the fibers. The preform had a bulk density of about 0.7 gm/cc, which was increased to about 1.75 gm/cc upon densification.

Although the foregoing invention has been described in some detail by way of illustration and example for purposes of clarity of understanding, it will be obvious that certain changes and modifications may be practiced within the scope of the appended claims.

What is claimed is:

1. A method for fabricating preforms, said method comprising:

shaping reinforcement strands into a fabric having a desired preform geometry, wherein at least some of said reinforcement strands have been served with threads of a thermoplastic material prior to shaping, said strands being arranged so that individual strands cross over one another at particular locations;

heating the shaped strands to a temperature sufficient to melt the thermoplastic threads, thereby causing the thermoplastic to migrate and collect at the cross-over locations of the reinforcement strands; and cooling the shaped strands so that the thermoplastic material solidifies, whereby the strands are held in the desired preform geometry by the solidified thermoplastic at said cross-over locations.

2. A method as in claim 1, wherein the reinforcement strands are composed of a material selected from the group consisting of glass fibers, silicon carbide fibers, aluminum oxide fibers, polyamide fibers, carbon fibers, and combinations thereof.

3. A method as in claim 2, wherein the reinforcement strands are multiple filament yarns.

4. A method as in claim 3, wherein the reinforcement strands include from 100 to 20,000 filaments, each filament having a diameter in the range from 1 to 150 $\mu$m.

5. A method as in claim 1, wherein the reinforcement strands are not impregnated with a matrix material.

6. A method as in claim 1, wherein the thermoplastic threads are composed of a material, selected from the group consisting of polyamide, polyester, polycarbonate, polysulfone, acrylonitriles, and combinations thereof.

7. A method as in claim 1, wherein the serving thread is wrapped around the reinforcement strands at a pitch of at least 5 turns per inch.

8. A method as in claim 7, wherein at least two thermoplastic serving threads are wrapped around the reinforcement strands in opposite directions.

9. A method as in claim 1, wherein the thermoplastic threads are monofilaments.

10. A method as in claim 1, wherein the thermoplastic threads are multiple filament yarns.

11. A method as in claim 1, wherein the reinforcement strands are shaped in a two-dimensional geometry or multiple-dimensional.

12. A method as in claim 1, wherein the reinforcement strands are shaped in a three-dimensional geometry.

13. A method as in claim 12, wherein the reinforcement strands are shaped by weaving on a mandril.

14. A method as in claim 13, wherein the mandril is heated to melt the thermoplastic threads.

15. A method as in claim 1, wherein the shaped strands are heated in an oven.

16. A method as in claim 1, wherein the shaped strands are heated by a heated gas stream introduced during or after completion of the shaping.

17. A method as in claim 1, wherein the shaped strands are heated by a radiant heat source.

18. A method as in claim 1 wherein the thermoplastic material is present on the reinforcement strands in an amount at from about 0.1 to 10% by weight of the reinforcement strands.

19. A method for fabricating composite articles, said method comprising:
 shaping reinforcement strands into a fabric having a desired preform geometry wherein at least some of said reinforcement strands have been served with threads of a thermoplastic material prior to shaping, said strands being arranged so that individual strands cross over one another at particular locations;
 heating the shaped strands to a temperature sufficient to melt the thermoplastic threads, thereby causing the thermoplastic to migrate and collect at the cross-over locations of the reinforcement strands;
 cooling the shaped strands so that the thermoplastic material solidifies, whereby the strands are held in the desired geometry by the solidified thermoplastic at said cross-over locations to form the preform;
 impregnating the preform with a curable matrix material; and
 curing the matrix material to form the composite article.

20. A method as in claim 19, wherein the reinforcement strands are composed of a material selected from the group consisting of glass fibers, silicon carbide fibers, aluminum oxide fibers, polyamide fibers, carbon fibers, and combinations thereof.

21. A method as in claim 20, wherein the reinforcement strands are multiple filament yarns.

22. A method as in claim 21, wherein the reinforcement strands include from 100 to 20,000 filaments, each filament having a diameter in the range from 1 to 150 μm.

23. A method as in claim 19, wherein the reinforcement strands are not impregnated with a matrix material.

24. A method as in claim 19, wherein the thermoplastic threads are composed of a material selected from the group consisting of polyamide, polyester, polycarbonate, polysulfone, acrylonitriles, and combinations thereof.

25. A method as in claim 19, wherein the serving thread is wrapped around the reinforcement strands at a pitch of at least 5 turns per inch.

26. A method as in claim 25, wherein at least two thermoplastic serving threads are wrapped around the reinforcement strands in opposite directions.

27. A method as in claim 19, wherein the thermoplastic threads are monofilaments.

28. A method as in claim 19, wherein the thermoplastic threads are multiple filament yarns.

29. A method as in claim 19, wherein the reinforcement strands are shaped in a two-dimensional geometry.

30. A method as in claim 19, wherein the reinforcement strands are shaped in a three-dimensional geometry.

31. A method as in claim 30, wherein the reinforcement strands are shaped by weaving on a mandril.

32. A method as in claim 30, wherein the mandril is heated to melt the thermoplastic threads.

33. A method as in claim 19, wherein the shaped strands are heated in an oven.

34. A method as in claim 19, wherein the shaped strands are heated by a heated gas stream.

35. A method as in claim 19, wherein the shaped strands are heated by a radiant heat source.

36. A method as in claim 19 wherein the thermoplastic material is present on the reinforcement strands in an amount at from about 0.1 to 10% by weight of the reinforcement strands.

37. In a method for fabricating preforms including a plurality of reinforcement strands woven in a desired geometry so that individual strands cross-over one another at particular locations, the improvement comprising utilizing reinforcement strands which have been served by a thermoplastic thread, whereby the preform may be rigidized by heating the shaped strands to melt the thermoplastic, thereby causing the thermoplastic to migrate and collect at the cross-over locations, followed by cooling the shaped strands to solidify the thermoplastic at said cross-over locations.

38. A method as in claim 37, wherein the thermoplastic thread is composed of nylon.

39. A method as in claim 38, wherein the thermoplastic thread is a multifilament yarn.

40. A method as in claim 37 wherein the thermoplastic material is present on the reinforcement strands in an amount at from about 0.1 to 10% by weight of the reinforcement strands.

* * * * *